United States Patent [19]
DeSpain et al.

[11] Patent Number: 5,812,060
[45] Date of Patent: Sep. 22, 1998

[54] AUTOMATED WASTE COOKING GREASE RECYCLING TANK

[75] Inventors: James E. DeSpain; Scot R. Garrison, both of Kernersville, N.C.

[73] Assignee: Darling International, Inc., Irving, Tex.

[21] Appl. No.: 846,839

[22] Filed: May 1, 1997

[51] Int. Cl.⁶ .................................................. G08B 21/00
[52] U.S. Cl. .......................... 340/618; 340/622; 340/624; 73/305; 73/311
[58] Field of Search ..................... 340/618, 624, 340/623, 622; 73/305, 313, 311, 319, 292, 314; 141/198

[56] References Cited

U.S. PATENT DOCUMENTS

| | | | |
|---|---|---|---|
| 3,617,539 | 11/1971 | Grutsch | 210/13 |
| 4,053,394 | 10/1977 | Fisk | 210/8 |
| 4,284,210 | 8/1981 | Horak | 222/14 |
| 4,360,046 | 11/1982 | Streit et al. | 141/82 |
| 4,372,856 | 2/1983 | Morrison | 210/603 |
| 4,430,225 | 2/1984 | Takamatsu et al. | 210/608 |
| 4,485,831 | 12/1984 | Ungerleider | 137/1 |
| 4,646,793 | 3/1987 | Sherratt | 141/1 |
| 4,787,978 | 11/1988 | Nicol | 210/605 |
| 4,926,015 | 5/1990 | Takahashi et al. | 200/84 |
| 5,015,384 | 5/1991 | Burke | 210/603 |
| 5,225,085 | 7/1993 | Napier et al. | 210/705 |
| 5,240,043 | 8/1993 | Campbell | 137/899 |
| 5,347,864 | 9/1994 | Senghaas et al. | 73/313 |
| 5,349,994 | 9/1994 | Koeninger | 141/94 |
| 5,360,555 | 11/1994 | Batten | 210/803 |
| 5,364,529 | 11/1994 | Morin et al. | 210/608 |
| 5,392,965 | 2/1995 | Azuma et al. | 222/396 |
| 5,433,846 | 7/1995 | Roshanravan | 210/195 |
| 5,543,050 | 8/1996 | Roshanravan | 210/605 |
| 5,607,002 | 3/1997 | Siegele et al. | 141/198 |
| 5,609,193 | 3/1997 | Steckler | 141/231 |

*Primary Examiner*—Jeffery A. Hofsass
*Assistant Examiner*—Davetta Woods
*Attorney, Agent, or Firm*—Baker & Botts, L.L.P.

[57] ABSTRACT

An automated waste cooking grease recycling tank having a top, a bottom, at least one side wall defining an inside and an outside of the tank with a plurality of openings in the tank. A liquid level sensor is inserted into the inside of the tank through one of the plurality of openings with the liquid level sensor operatively connected for sensing at least first and second different liquid levels inside of the tank. A control panel is positioned outside of the tank, operatively coupled to the level sensor and having first and second indicators thereon responsive to signal the first and second different liquid levels sensed inside of the tank. A fill pump is operatively coupled to the control panel and responsive to the control panel for adding grease.

12 Claims, 3 Drawing Sheets

AUTOMATED WASTE COOKING GREASE RECYCLING TANK

TECHNICAL FIELD OF THE INVENTION

The present invention relates to a recycling tank and particularly to an automated container for waste grease generated by food preparation.

BACKGROUND OF THE INVENTION

Many restaurants use large grills for frying food and many restaurants use large grease fryers such as those used for deep frying french fries and chicken. The grease from these restaurant food preparation units becomes partially burned and contaminated with cooked and burned food particles and must be periodically changed. In some commercial frying units, filter systems are used to prolong the useful life of the grease; however, eventually, the cooking grease becomes unusable for purposes of preparing palatable food and must be replaced with clean grease or cooking oil.

In the past, used cooking oil or grease was drained into buckets, transportable containers or the like and the buckets were manually carried to a collection barrel, vat or tank, typically located outside of the food processing establishment. The onsite collection barrels were then periodically emptied into a collection truck which transported the waste grease to rendering or recycling facilities is or to proper disposal facilities.

Normally, waste cooking grease is hot when it is drained from the food preparation device into a bucket or container. Draining or carrying the buckets to a collection barrel results in the potential for injury due to burns from the hot grease. There is also a potential for spilling during the drainage procedure which can create a hazardous condition inside of the cooking establishment. Also, there is a potential for spilling during the manual transporting of the waste grease to the collection barrel outside of the food establishment. Additional risk of spillage occurs upon pouring the grease into the collection barrels or bulk containers. Overfilling the collection container and rain water collection in the containers can also cause overflow spilling outside. Each spill of the grease, unless properly cleaned, can result in environmental pollution. Polluting may also result in citations and fines under appropriate ordinances, regulations and laws designed to protect the environment from pollution.

Typically, waste grease collection barrels have remained exterior to the food preparation establishment or outside the restaurant and have, therefore, not been appropriately constructed for usage inside the restaurant. Therefore, even where others may wish to locate a collection barrel inside the restaurant, placement there would not be appropriate. Such prior barrels are not constructed with appropriate corrosion resistant and cleanable surfaces. Particularly fittings, hinges, openings, and the like for a device used inside of a restaurant should be completely sealed and should prevent any collection or accumulation of waste grease, oil or food remnants in or around such seams, fittings, connections or openings. The material from which the devices are constructed are typically not adequately resistant to corrosion to provide sanitary cleanable surfaces.

In prior waste cooking grease collection devices, heating elements were continuously energized to maintain the grease in a liquid state to facilitate emptying of the tank. This could result in substantial expense for energy or added construction costs for insulating of the collection barrel. Also, unless the operators were very careful to avoid emptying the tank completely or to turn off the heating element upon emptying the tank, a heating element which was not covered by grease could potentially reach temperatures higher than necessary, thereby increasing the risk of combustion within the tank.

The present invention relates to an improved automated waste cooking grease collection and recycling tank which addresses, overcomes and reduces many of the above-described drawbacks of previous waste cooking grease collection systems.

SUMMARY OF THE INVENTION

The present invention relates to an automated waste cooking grease recycling tank with unique aspects for interfacing with a source of waste cooking grease such as cooking devices (e.g., deep fryer units and grills) for safely pumping waste cooking grease from the cooking unit into a recycling tank for collection and transport to rendering facilities. The automated recycling tank comprises a tank, a fill pump, a level sensor, a control panel coupled to the level sensor and to the fill pump, a conduit for carrying grease connectable between the source of waste cooking grease, the fill pump and the tank. The fill pump is interposed along the inlet conduit and is responsive to the control panel for pumping waste grease into the tank only when the level sensor indicates additional capacity remaining in the tank. The control panel automatically deactivates the pump when a predetermined maximum level is sensed and prevents the fill pump from overfilling the tank. Preferably, the inlet conduit is connectable to the one or more cooking units. A quick-connect inlet coupling may be provided for this purpose. The preferred embodiment also includes a vent and an outlet line from the tank and a quick-connect outlet coupling. Preferably, the outlet coupling is located outside of the food preparation establishment. The recycling tank provides for easy, environmentally safe collection and transport of waste cooking grease from the cooking unit to the recycling tank and from the recycling tank to rendering facilities.

According to one aspect of the present invention, a fill pump, control panel and level sensor interface is provided between a food preparation device and the automated waste grease recycling tank. The fill pump may be activated directly at the control panel or remotely from the fryer unit for pumping waste grease into the recycling tank. Uniquely, the interface with the level sensor allows pumping only when there is sufficient capacity in the recycling tank for receiving additional waste grease. This interface allows the convenience of changing the fryer grease as needed, yet avoids the potential for overfilling the recycling tank and the associated hazards which can result from spilling or from overfilling the recycling tank.

According to another aspect of the present invention, the control panel is preferably a modular control panel which is connectable through disconnectable couplings to a power source, to a level sensor, to a fill pump, to a heater and to a heater control. Thus, the entire control panel may be removed for service, replaced with a new control panel, and carried to another location for repair or service.

Also preferably, disconnectable couplings also permit quick-connect coupling for receipt of control signals from a remote location such as at a cooking unit. Advantageously, upon coupling the inlet conduit to the remote cooking unit, the interface coupling can also be connected, thereby permitting the operation of the pump in a safe and efficient manner from the waste grease producing cooking unit itself.

In addition, the unique modular control panel is preferably constructed with a sealed control panel assembly consisting of a polycarbonate-polyester or a Lexan alloy screen-printed layer bonded to a UL rated fiberglass circuit board. Preferably, a circuit board in the control panel may serve as a substrate for flat panel push buttons and also for viewing any instructions or printed matter and for holding visible light signals or LED's. Also preferably, the polycarbonate-polyester alloy or the Lexan alloy touch pad is subsurface printed with functional, directional, informative and/or aesthetic artwork and printed matter. The subsurface printing protects the ink from scratching and chipping. All switches, buttons and indicator lights are located behind the polycarbonate-polyester or the Lexan alloy touch pad layer to provide protection to the components and to facilitate wipe down cleaning, thereby enhancing the usefulness of the device in a sanitary food preparation environment, such as in a restaurant.

According to another aspect of the invention, a level sensor mechanism is provided inside the recycling tank. The level sensor mechanism advantageously has capabilities for detecting a plurality of predetermined levels, preferably a full condition of the tank is detectable, a nearly full tank condition is detectable, and a minimally full condition is detectable. Preferably, the level sensor mechanism appropriately signals the control panel or permits the control panel to poll or sense its condition at each detectable level. The control panel automatically responds appropriately when certain predetermined levels are sensed. For example, when the level sensor signals that the tank is full, power to the fill pump will be automatically discontinued and no further pumping will be permitted. A first light may also be illuminated on the control panel so that the operator understands that the tank is full and must be emptied. Another light is activated when the level sensor indicates that the recycling tank is partially full. At this second light, the operator should be prompted by the light to "call for pickup" of the waste cooking grease and emptying of the recycling tank. The collected waste grease can then be drained and transported to a rendering plant before the tank is completely full. The first and second lights are preferably first and second predetermined, distinctively different colors. For example, the predetermined first color may be red and the predetermined second color may be amber or yellow, to facilitate ease of communication to an operator of the device. An audible signal such as a buzzer might also be activated at one or more of the sensed levels within the recycling tank. Either or both of the "full" level and the "call for pickup" level lights may be activated along with an audible signal. Advantageously, a predetermined minimally full level is also detected by the level sensor and sensed by an automatic control mechanism, preferably within the control panel. The minimally full level is preferably above the level of a heater element within the recycling tank. The control panel heater unit automatically deactivates the heater unless the minimally full level is reached. A third signal light indicating that the heater is "on" will result only if the minimally full level is sensed.

According to another aspect of the invention, the level sensor is constructed of a hollow tubing sealingly inserted and extending vertically inside of the recycling tank substantially from the top to the bottom of the tank. The hollow tube preferably is stainless steel and has magnetic reed switches fixed inside at predetermined positions corresponding to the minimum level, the nearly full level, and the completely full level. These predetermined positions correspond to the "heater on" level, the "call for pickup" level and the "tank full" level, respectively. A float having a permanent magnet attached thereto is slidingly coupled to the hollow tubing and guided thereby for floating up and down the hollow tube with the rise and the fall of the grease level within the tank. When the level of the grease, and therefore the level of the float, reaches a particular reed switch position, the reed switch is activated and this condition is communicated to a control panel. Simplification of the electrical circuits and increased reliability of the mechanical elements can be achieved by using more than one float to activate different reed switches. Preferably and advantageously, the sensory signals may be carried along signal transmission lines through the hollow tube out of sealed openings and directly between the control panel and the reed switches of the level sensor.

According to another aspect of the present invention, a thermistor, a thermocouple or an RTD is attached at or near the bottom end of the same hollow tube used for level sensing. This permits a signal indicative of the temperature of the grease to be communicated between the temperature sensor and the control panel along lines extending through the same tube and the same sealed opening as the signal transmission lines for the level sensor switches.

According to another aspect of the invention, a plurality of fryer units and a plurality of recycling tanks may be interconnected through a single control panel for convenience and coordinated waste grease collection and recycling throughout a large food preparation establishment.

According to another aspect of the present invention, the condition of a tank, the operation of the pump, the temperature, the level of grease, the alarm conditions, etc. therein may be remotely monitored through appropriate phone lines, modem connection, radio broadcast, or other telemetry devices. Such monitoring capabilities may advantageously permit a recycling facility, rendering plant, collection company or other service provider to cost effectively schedule maintenance and collection of waste cooking grease for a large number of food preparation establishments thereby relieving the establishment operators from the administrative duty of calling for service and scheduling waste grease pick up at their individual establishments.

According to yet another aspect of the present invention, the construction of the recycling tank is of a strong and highly corrosion resistant material. Preferably, the construction of the exterior covering is entirely of stainless steel. Further, all surfaces are substantially flat and cleanable. Any seams are completely welded, sealed or secured with such close abutment fitting that no grease accumulation can penetrate the seams. Further, the number of openings into the tank is minimized and all openings are sealed with fittings and attachments which are provided with appropriate surface-to-surface seals, gaskets and/or grommets to prevent entry or accumulation of any waste grease, cooking oil or food remnants. Preferably, the recycling tank is insulated against thermal energy loss and also to reduce exposure of operators to hot surfaces. Because of this construction, the entire recycling tank device is uniquely and advantageously suitable for use inside of a restaurant establishment while maintaining appropriate cleanliness and sanitary conditions acceptable for public food preparation.

BRIEF DESCRIPTION OF THE DRAWINGS

The foregoing objects, advantages, and features, as well as other objects and advantages, will become more apparent with reference to the detailed description, claims and drawings below, in which like numerals represent like elements and in which:

DETAILED DESCRIPTION OF THE PREFERRED EMBODIMENTS

Figure 1:
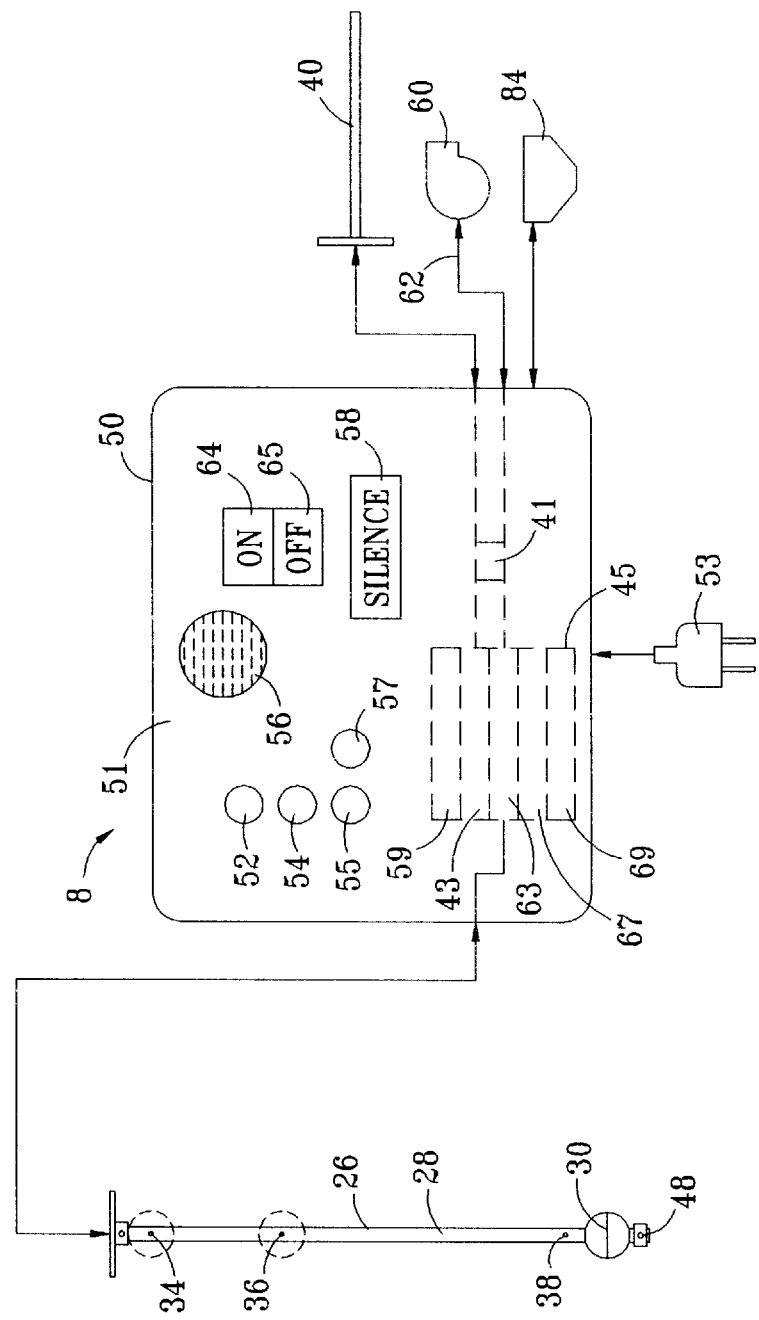
FIG. 1 is a schematic diagram of an interface control system, according to the present invention.

FIG. 1 is a schematic diagram of an inventive interface control system 8 for waste grease recycling. As will be described more fully below with reference to FIGS. 2 and 3, the interface control system is useful with a waste grease recycling tank 10. Basically as shown in FIG. 1, a control panel 50 receives power at power source 53 and receives input instructions from an operator through buttons 58, 64 and 65, and provides information to the operator visually and audibly as with lights 52, 54, 55 and 57 and a buzzer 56 on its face 51. Also, input information is received from interconnected devices which may include a level sensor 26, remote cooking unit control 84, a pump 60, a temperature sensor 48 and a heater unit 40. Control instructions are provided by the control panel 50 to the pump 60 and to the heater 40. System condition information is provided to the operator with lights 52, 54, 55 and 57 and a buzzer 56. Pump lockout circuitry 63 is provided to disable the pump 60 when the level sensor 26 indicates that a maximum level has been reached. Heater lockout circuitry 43 is provided to disable the heater 40 when the level sensor 26 indicates a predetermined minimum safe operating level has not been reached. Preferably, a combination of circuitry 45 of the control panel 50 may be incorporated in a microprocessor or a CPU generally represented by reference number 45.

Figure 2:
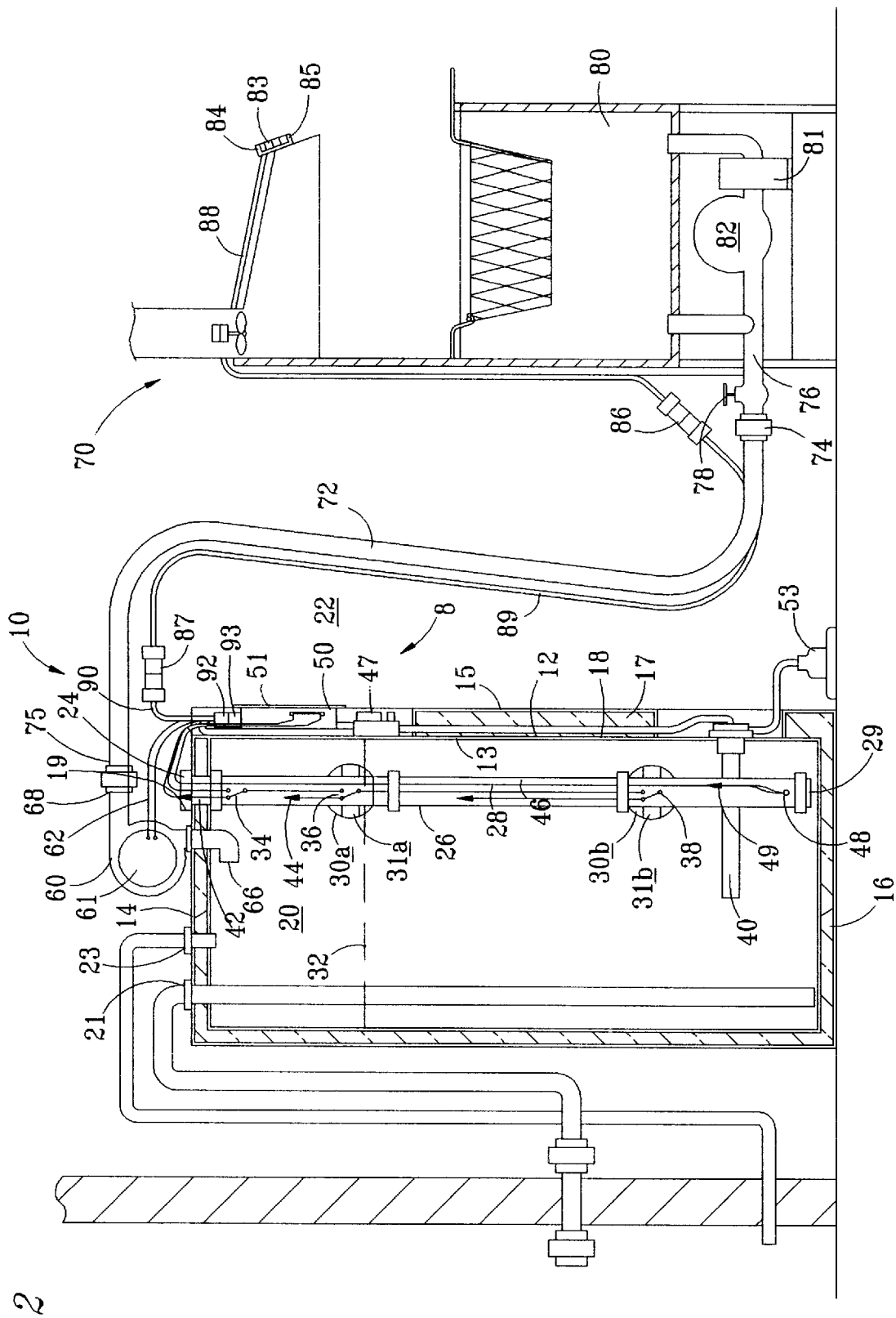
FIG. 2 is a schematic, partial cross-sectional view of an inventive recycling tank with the interface control system of FIG. 1 in a restaurant environment in combination with an inventive level sensor unit, control panel, pump motor, heater and thermistor, according to certain aspects of the present invention, including a deep fryer cooking unit from which waste cooking grease is collected for recycling.

FIG. 2 is a schematic, side cross-sectional view of the inventive waste grease recycling tank, according to one embodiment of the present invention. The recycling tank 10 comprises a tank body 12 having a top 14, a bottom 16, and at least one side wall 18 which define an inside area 20 and an outside area 22. Preferably, the tank body 12 includes an inlet opening 19, an outlet opening 21, and appropriate vent opening 23 to allow equalization of pressure upon filling and emptying of the recycling tank. The recycling tank is advantageously formed of a carbon steel interior 13 with a stainless steel exterior 15, preferably thermally insulated as with insulation 17, and with dimensions of between about 20–45 inches from side to side and about 60–85 inches high; for example, 21"×44"×70" to provide sufficient volume and to advantageously fit into a standard space allotted for appliances in many restaurant kitchens. Preferably, dimensions of about 30"×30"×70" will advantageously fit into spaces for certain modularized restaurant construction. There is a liquid level sensor mechanism 26 sealingly attached to and extending through an opening 24 into tank body 12. The liquid level sensor 26 communicates one or more sensed grease levels from inside of the tank to outside of the tank.

Preferably, the liquid level sensor 26 comprises a hollow tube 28 which extends vertically substantially from the top 14 to the bottom 16 of tank body 12 and is sealed at bottom end 29 and through opening 24. The hollow tube 28 acts to supportingly guide a float 30, which float 30 is designed to trigger grease level indicating conditions as float 30 slides along hollow tube 28, rising and falling with the level of grease inside of tank body 12. In the embodiment depicted, level indicating switches 34, 36 and 38, mounted at predetermined positions or levels along a length of the vertically extending hollow tube 28, are turned "on" or "off" as the float is raised or lowered by the level of grease 32.

In the preferred embodiment, as will be more fully understood with reference to both FIG. 1 and the schematic partial cross-sectional view of FIG. 2, the hollow tube 28 is constructed of stainless steel material and a float 30, also preferably constructed of hollow stainless steel. Preferably, more than one float, 30a and 30b, are provided and are constructed of material which has buoyancy in collected waste grease 32. Float 30 or floats 30a and 30b further preferably include a magnet 31, or magnets 31a and 31b, capable of activating switches 34, 36 or 38 as a float is carried or buoyed by the waste grease 32 as it fills the tank. In the embodiment depicted, there is a maximum level switch 34 which is positioned along hollow tube 28 for activation by an upper float 30a when the tank has reached a predetermined maximum level or a maximum capacity. Preferably, the predetermined maximum level corresponds to a full tank condition and is produced when the float 30a is raised all the way to the top of hollow tube 28. At this level, a first signal is produced at a first indicator light 52 on control panel 50 and a pump lockout circuit 63 is activated to disable pump 60 until the tank is drained, at least below switch level 34.

An intermediate switch 36 is in a predetermined position to indicate that grease in the tank is at a predetermined intermediate level and there is a predetermined capacity remaining. Preferably, float 30a activates switch 36 when the tank is sufficiently full that it is appropriate to attend to emptying the tank. A second signal will be produced at a second indicator light 54 on control panel 50. Typically, the grease at this level will require calling a service provider, such as a rendering facility, for "pickup" of the waste grease or to otherwise schedule emptying of the recycling tank.

Also preferably, there is a minimum level switch 38 positioned near the bottom 16 of tank body 12 for sensing a minimum grease level at or above a predetermined minimum level for safe heating of the grease with a heater unit 40. A third signal will be produced at indicator light 56 when the heater is on. When the grease has not reached minimum level switch 38, a heater lockout circuit disables the heater unit 40. Although a single float 30, as depicted in FIG. 1, could activate all of the switches 34, 36 and 38, it is preferable, as depicted in FIG. 2, to activate switches 34 and 36 with an upper float 30a and switch 38 with a lower float 30b so that the circuitry is simplified and the mechanical reliability is increased.

The condition of switch 34 is preferably communicated to control panel 50 with a first signal transmission line 42. The condition of switch 36 or the "call for pickup" switch 36 is preferably communicated to control panel 50 through a second signal transmission line 44 and the condition of minimum level switch 38 is preferably communicated to the control panel through a third transmission line 46. The foregoing waste grease level sensor 26 can be constructed using an appropriately modified industrial level sensor available from Industrial Devices, Model No. NCG-4231-B-52 with TC and Gems Sensors, LS 800, Type 4. Heater unit 40 may comprise a heating element available from Ogden.

In a further preferred embodiment, a temperature sensor 48 is also attached sealingly in the tank body 12. Advantageously, temperature sensor 48 is inserted through the hollow tube 28 and is attached to the tank and extends vertically to a position near the bottom 16 of tank body 12. In this manner, the temperature of the grease 32 can be monitored or otherwise detected and a signal indicating the temperature may communicate from inside the tank to outside the tank through hollow tubing 28. Preferably, the temperature signal is communicated and is received by control panel 50 as through a temperature signal line 49. The control panel 50 can be mounted either on the tank or at a remote location such as at a fryer unit. This unique construction advantageously allows direct communication lines such as electrical wires to carry signals between sensors inside the tank and a control panel 50 outside of the tank.

A temperature signal line 49 which extends through the same opening 24 as is used for the level signal transmission lines 42 and 46 further advantageously allows the recycling tank 10 to be formed with a minimum number of openings, in this case one opening 24 and an appropriate seal 25. This eliminates additional openings and corresponding seals for separate levels or for the temperature sensor 48. This construction also advantageously allows the outside surface of the tank body 12 to be more readily cleanable and, therefore, more easily adaptable for sanitary use inside a restaurant or other public food preparation establishment.

As will be understood more fully below with reference also to the detailed schematic depiction of a control panel 50 in FIG. 3, the temperature sensor 48 communicates to the control panel to give an indication of the grease temperature inside of the recycling tank. Preferably, a temperature adjustment 47 is provided so that service personnel may increase or decrease the temperature within a predetermined range of temperatures. Thermal insulation 17 on the outside of the tank, between the carbon steel interior 13 and the stainless steel exterior 15, facilitates maintaining a desired temperature and helps provide energy conservation and worker safety. The temperature adjustment 47 may, for example, be a potentiometer used to increase or decrease the amount of heat or the amount of electrical current provided to heater unit 40. In the preferred embodiment, the heater unit 40 is either "on" or "off" and the temperature of the grease is controlled by the length of time "on" or "off". Also in the preferred embodiment, the heater unit 40 is automatically prevented by circuitry 45, and particularly, heater lockout circuit 43 in the control panel 50, from receiving electrical heating energy unless the level sensor 26 communicates to the control panel that the grease level is at or above the predetermined minimum level as indicated by the position of switch 38. Preferably, the predetermined minimum level will be about four inches above heater unit 40. Thus, when a float 30 is floating on the level of grease adjacent to or above reed switch 38, magnet 31 activates the reed switch 38. The activated condition of switch 38 is communicated along signal transmission line 46 to the control panel 50. Only after switch 38 is activated will the control panel 50 permit the heater unit 40 to receive energy. The amount of energy received by heater unit 40 depends upon the length of time "on" or "off", which determines the temperature of the tank contents and is controllable within certain limits.

According to a further aspect of the invention, it has been found that the temperature of the waste grease 32 in the recycling tank 10 should remain in the range of between about 100° F. and 150° F. Thus, advantageously, according to one embodiment of the inventive combination, automatic temperature control circuitry 39, as may be preprogrammed into circuitry 45 within control panel 50, also acts to limit the length of time "on" and, therefore, to preclude the heater unit 40 from increasing the temperature of the contents of the tank above a predetermined maximum temperature, such as about 140° F., regardless of the temperature selected by the service personnel, using temperature adjustment 47.

Referring again to FIG. 2, the pump 60 is preferably mounted directly onto the tank body 12. Preferably, pump 60 is a gear pump and is driven by a motor 61. Preferably, motor 61 has a horse power rating of about ¾ h.p. or more to increase the distance the tank may be located away from a source of waste cooking grease. A gear pump construction with the preferred power rating advantageously permits the grease to be pumped through a ¾ inch diameter conduit from a distance of about 50 feet and to a head height of about 70 inches. It has been found that a gear pump which is self-priming and which creates a vacuum of about 23 inches, such as one manufactured by Sherwood or by Viking, will function acceptably in this inventive combination. The liquid grease is drawn through an inlet conduit 72 or a flexible inlet hose 72 with appropriate coupling connections at the inlet 68. The inlet conduit 72 may be flexible to facilitate selectable connection to a plurality of different cooking units, fryers or other sources of waste grease 80. Fixed conduits to one cooking unit could be used or fixed conduits to more than one unit, as with valves (not shown), could alternatively be used. Grease pumped from a fryer unit 70 is discharged through discharge 66 into the inside of tank body 12.

A switch or a button 64 is provided, preferably mounted on control panel 50, to start pumping of grease into tank body 12. Pump button 64 communicates with pump 60 and motor 61 as through signal line 62 to start pump 60. Pump 60 may be turned on for filling the tank at any time that a float 30 has not yet reached the uppermost switch 34. Thus, pumping can be initiated by an operator using "on" button 64 any time a full tank condition is not sensed in the tank. The operator can also turn the pump off with "off" button 65. Preferably, the control panel 50 includes pump time circuitry 67 to automatically turn the pump off after a predetermined time to avoid damage from running dry. A pump 60, according to the present invention, can empty a fryer unit of about 100 gallons of grease in less than three minutes. An automatic shutoff time of about five minutes may be set to insure complete pumping, yet to avoid excessive running without actually pumping grease.

Also, the motor 61 can be turned on and off or "bumped" using buttons 64 and 65 alternatingly to dislodge clogged grease. However, to avoid potentially damaging power surges, a delay circuit 69 is provided in control panel 50. A delay of about 100 milliseconds or more between turning the pump off and then turning it back on has been found adequate to prevent damage to the pump motor.

As indicated schematically in FIG. 2, conduit 72 is extended to a fryer unit 70 in which there is waste grease to be collected. The conduit 72 is coupled through a quick-connect sealed coupling 74 to a flyer discharge outlet 76 or a fryer drain tube 76 provided on the fryer unit 70. The drain tube from the fryer unit is typically constructed having a valve 78 which remains closed until the fryer grease 80 in the fryer unit 70 is to be drained. In the present invention, the fryer outlet 76 is appropriate adapted with the desired corresponding quick-connect coupling for interconnection with the coupling 74 on conduit 72. Preferably, prior to draining the grease 80 from the fryer unit 70, fryer unit pump 82 will be run to pump grease 80 through a complete cycle through a filter 81 to preliminarily filter large waste food materials from the grease. The grease will also normally be in a heated condition so that the conduit or hose 72 is preferably constructed with thermal insulation to allow handling without burning. Similarly, the quick-connect coupling should be handled with care, including appropriate insulation or using appropriate heat resistant gloves.

In an alternative embodiment, a remote control panel 84 is appropriately connected for remote operation of the pump 60 from a fryer unit 70. Thus, the pump 60 may be activated using pump controls or, alternatively, may be activated directly from the fryer unit as by using a remote pump control 84. Such a remote control panel may be integrally built into the fryer unit 70, or it may be provided for attachment to the fryer unit or simply for use at or near the end of conduit 72. An interface connection 86 and a communication line 88 can extend from control panel 50 to the fryer unit 70. In either event, whether one uses buttons 64 or 65 at the tank or buttons at remote panel 84 at the cooking unit, the pump 60 is automatically prevented from operating when the tank is full. Whenever the float 30 has contacted or actuated switch 34 to indicate that the tank is in a full condition, control panel 50 disconnects power to pump 60. In the preferred embodiment, actuation of pump controls 64 or 65, or actuation of a remote pump control 84 as the case may be, sends a signal through communication lines to control panel 50. If switch 34 has been actuated, no signal is sent to pump 60. If high level switch 34 is actuated while pump 60 is already operating, the signal or power to pump 60 will be automatically discontinued. Preferably, also, as indicated below in FIG. 2, one embodiment of remote pump control 84 also includes a remote indicator light 83 so that the full condition is indicated to the operator who will know by the light that the fryer unit cannot be drained into the tank until the recycling tank is emptied. Thus, inadvertent overfilling of the recycling tank 10 is prevented. A "call for pickup" remote indicator light 85 may also be provided at remote control panel 84.

As part of the recycling tank control panel 50, the "call for pickup" indicator light 54 is provided, preferably an indicator light having a distinctive color, as for example, an amber or a yellow colored light. When this signal is given, the remaining capacity of the tank may be equal to about the volume of one or two fryer units. With a remaining capacity equivalent to one or two fryer units, sufficient time is allowed for scheduling of servicing and draining of the recycling tank for transportation of the waste grease to a rendering facility. The operator is prompted to call for grease pickup upon illumination of at the "call for pickup" indicator light 54. To further encourage the operator to actually call for pickup of the grease, a buzzer 56 or other sounding device is preferably also activated when the midlevel switch 36 is energized. The control panel is provided with a reset button 58 which turns off the "call for pickup" buzzer 56. The reset button 58 will not override the "tank full" sensor switch 34 and indicator light 54. Switch 34 acts together with control panel 50 to terminate all power to the pump 60 until additional capacity is regained by draining the tank. A timing circuit 59 is also preferably provided within the control panel 50 to reactivate the "call for pickup" buzzer 56, in the event that service is not called for or in the event that the tank is not emptied after the float 30 activates the midlevel sensor switch 36. Advantageously, according to this embodiment, the buzzer 56 will be reactivated to further encourage contacting and rescheduling of service after a predetermined time period such as one day.

Figure 3:
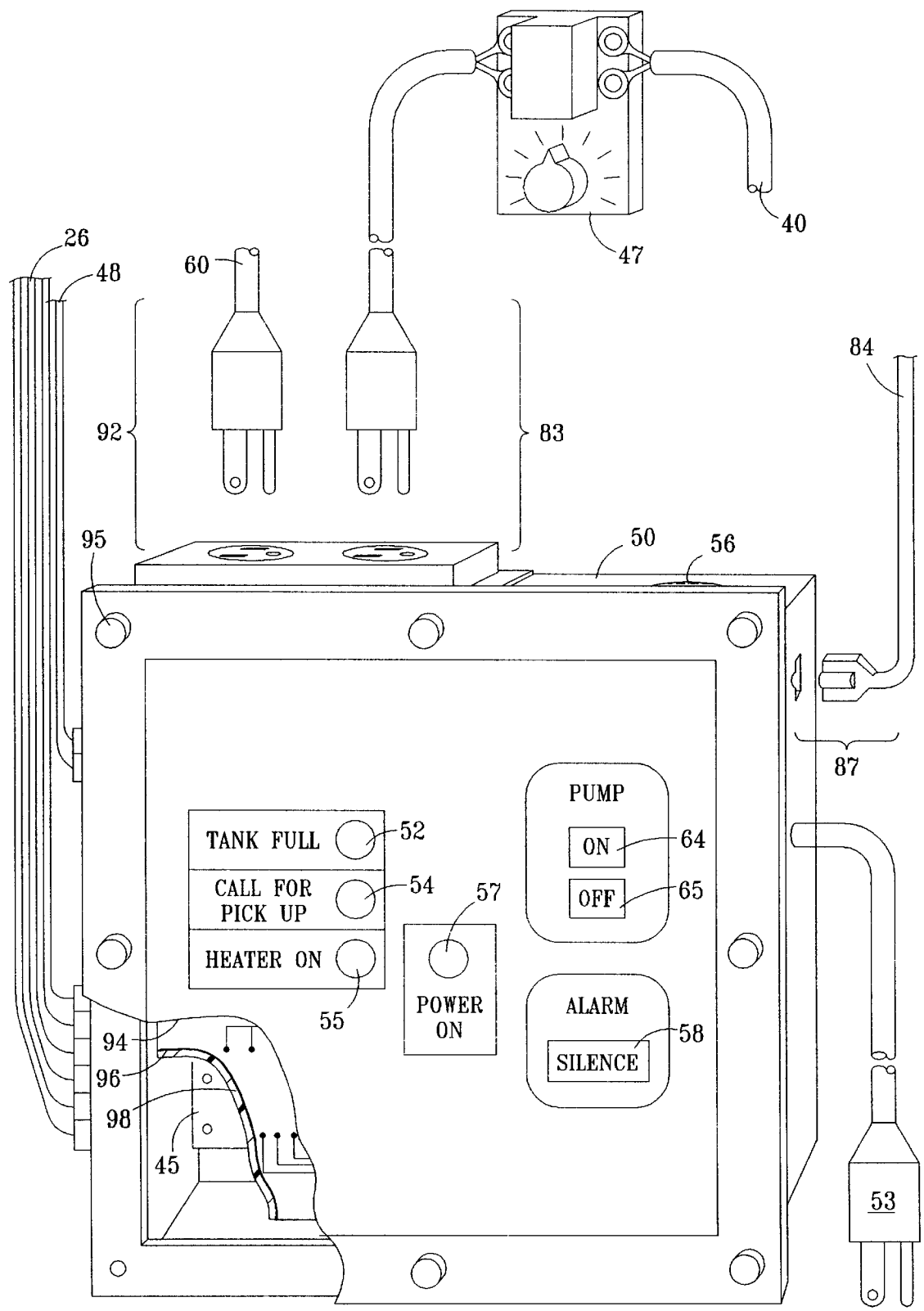
FIG. 3 is a schematic depiction of a control panel and interface components for use with the recycling tank assembly of FIG. 2.

In the preferred embodiment as shown in partial cutaway in FIG. 3, the control panel 50 consists of a microprocessor-based control system receiving input signals from level sensor switches, operator buttons, pump controls, heater controls and a reset button. Input and output signals are provided to and from devices such as the level sensor 26 and the temperature sensor 48, and particularly output control signals are provided to the pump 60, to the heater unit 40 and to the display indicator lights and sounding devices on the face 51 of the control panel 50. Remote control signals may also be communicated to and from remote control 84. The entire control panel 50 is enclosed in a single assembly designed to be detachably mounted on the tank body 12. In a preferred embodiment, a mounting plate 95 with removable fastening means 97 allows the face 51 of control panel 50 to be substantially flush with the exterior surface 15 of tank body 12. All signal transmission or communication lines are preferably detachably coupled using one or more plug connectors 92 and 93. The remote control 84 may be coupled using one or more connectors 86 and 87. A waterproof, flat operator interface panel is provided to both indicate the level with simple indicator lights and also to provide starting and stopping buttons for the pump 60. Face 51 of panel 50 may be constructed with a layer 90 of polycarbonate-polyester or a Lexan alloy screen printed and bonded as at 96 to a circuit board 94. Circuit board 94 serves as a substrate for appropriate mounting of the circuitry 45. For example, circuitry 45 might be contained in a CPU, microprocessor or a computer chip that is mounted on circuit board 94. Circuit board 94 also preferably serves to hold push buttons 64, 65 and 58, and also serves to hold the indicator lights 52, 54, 55 and 57, which may be LEDs or other suitable lights. For example, a NEMA4 flat operator interface panel may be appropriately constructed for this purpose, according to the present invention.

In the preferred embodiment, the operation of the recycling tank interface system will include the unit performing a self test when it is first powered up. For simplicity, powering up the system can be achieved with plugging the unit into a power source 53 such as a 120 V AC receptacle. After the power up and self test, a "power on" light 57 will remain on, and all other indicator lights 52, 54, 55 and, if connected, remote lights 83 and 85 will take their correct state, according to the state or conditions sensed in the recycling tank. In one embodiment, the buzzer 56 sounds at power up and automatically shuts off as a self test. In the event buzzer 56 sounds at any other time during the operation, pressing the reset or "silence" button 58 at any time will cause the buzzer 56 to shut off. In the event that the buzzer was activated by a "call for pickup" condition, button 58 will also reset the timer circuit 59 to reactivate the buzzer later if the tank is not emptied.

When an operator presses the "pump on" button 64, the pump 60 will be turned on and will operate until the "pump off" button 65 is pressed, or until a predetermined short time has passed, whichever occurs first. Preferably, a time of about five minutes will allow sufficient time to empty a standard fryer unit completely but will not operate the pump dry for too long. The time period may be programmable to allow different applications where the time required to complete pumping is likely to be more or less.

The temperature in the tank will be sensed by a sensor or temperature sensor 48 embedded inside the hollow tube 28. A minimum level switch or a low level switch 38 is mounted in the hollow tube 28 approximately four inches higher than the heating element of heater unit 40. Failure to receive a signal from the minimum level switch will activate heater lockout circuit 43 or otherwise prevent the heater circuitry from energizing until the minimum level is reached, thereby providing a signal to the control circuit. Once the heater 40 has been energized by the level rising to the minimum level switch, the temperature will be controlled by the circuitry

45, such as a microprocessor of control panel 50. The temperature setting may be adjusted by turning a potentiometer 47, but the circuitry 45 will be preprogrammed not to allow the temperature to exceed 140° F.

An intermediate level indicator light 54, which may be preferably an amber or a yellow colored light, will turn on when the grease level approaches the top of the tank thereby warning an operator to call for pickup of the grease while there is still adequate space within the tank to hold more waste grease. When this midlevel is reached, an audible signal will be turned on, as with a buzzer 56, until the audible signal is silenced with reset button 58. When the grease level reaches a predetermined maximum level, power to the pump is automatically inhibited by the control panel 50. An audible signal may also be sounded when the high level or the maximum level is sensed. The audible signal may also be silenced with the reset button 58.

Preferably, power is interrupted to the heater unit 40, as with interrupt circuit 41, whenever the pump 60 is turned on. This feature advantageously permits the use of circuitry having a reduced maximum current rating. Because the tank is thermally insulated and the grease will be maintained in a heated condition, and also because the time period of the pumping will not normally exceed five minutes, maintaining the grease in a liquid state will not be interfered with due to this feature. The start-up power surges, in combination with the power drawn by the heating element of heater unit 40, will not be simultaneously required so that a single power source to the control panel 50 will be adequate.

The control panel is also preferably provided with a test mode with some, and preferably all, of the following features. Pressing the buzzer reset button 58 and the pump "off" button 65 at the same time will cause all of the indicator lights to be lighted. Preferably, all of the indicator lights are long-lasting LEDs. Nevertheless, any LED which does not light or is otherwise defective can be detected with this testing mechanism. Certain alert modes will also be provided so that each indicator light will be preprogrammed to flash if an error has been sensed. There is preferably a "heater on" indicator light 55 which normally indicates whenever the heater is actually energized. This indicator light 55 will flash when the temperature is outside of predetermined limits (normally outside the 100° F. to 140° F. range). The flashing of this light will indicate a probable cause that either the sensor switch 38 is open or shorted or the heater unit 40 is burned out. The midlevel indicator light, or the "call for pickup" indicator light, 54 will flash when either the minimum level signal has not been received, indicating that the lower float 30b has not raised to the level of sensor switch 38 or, alternatively, the "call for pickup" indicator light 54 will flash when the midlevel signal from sensor switch 36 is not provided yet the maximum level signal from sensor switch 34 is provided. Either of these situations indicates that a level switch 34 or 36 has failed or that the float 30b is stuck along the hollow tube 28. The maximum level indicator light 52 will flash when both the maximum level sensor switch 34 is activated and either the midlevel sensor switch 36 or the minimum level sensor switch 38 is not also activated. This indicates either that a switch has failed or that a float is stuck. Detecting these situations will permit service personnel to determine and correct the errors and will avoid reliance upon the indicators in situations where erroneous results could be presumed because of failed indicator lights, failed switches or stuck floats or the like.

Other alterations and modifications of the invention will likewise become apparent to those of ordinary skill in the art upon reading the present disclosure, and it is intended that the scope of the invention disclosed herein be limited only by the broadest interpretation of the appended claims and equivalents to which the inventors are legally entitled.

What is claimed is:

1. An automated container for waste grease recycling, comprising:

a tank having a top, bottom, and at least one side wall with a plurality of openings;

a liquid level sensor mounted to said tank through one of the openings thereof, said liquid sensor located to respond to a high liquid level, an intermediate liquid level, and a low liquid level to generate a high level signal, an intermediate level signal, and a low level signal;

an inlet line for transfer of waste grease to said tank, said inlet line mounted in one of the openings of said tank, the opening of the inlet line positioned in said tank at a level about the high liquid level;

a fill pump coupled to the inlet line and having an input port connected to a fill line coupling;

an outlet line having a first end inserted in an opening of said tank and mounted thereto, said outlet line having an inlet in said tank at a level below the low liquid level;

a vent line inserted in one of the plurality of openings in said tank and mounted thereto, the opening of the vent line located in said tank at a level above the high liquid level;

a thermostat mounted to be responsive to the temperature of grease within said tank to generate a grease temperature signal;

a heating element inserted in an opening of said tank, the opening located in said tank at a level below the low liquid level;

a controller having a tank full indicator, a call-for-pickup indicator, and a heater-on indicator and responsive to the high level signal, the intermediate level signal, the low level signal, and the grease temperature signal, said controller connected to said fill pump and said heating element; and said controller further including a processor responsive to the high level signal to actuate the tank full indicator, the processor responsive to the intermediate level signal to actuate the call-for-pickup indicator and the processor responsive to the grease temperature signal to actuate said heating element and the heater-on indicator.

2. The automated container for waste grease recycling as set forth in claim 1 wherein said processor responds to the low level signal to deactivate said heating element for a waste grease level in said tank below the low liquid level.

3. The automated container for waste grease recycling as set forth in claim 1 wherein said processor responds to the high level signal to disable said fill pump.

4. The automated container for waste grease recycling as set forth in claim 1 further comprising:

an alarm for audibly sounding a warning in response to the intermediate level signal;

a manual override switch for turning off said alarm; and said processor operatively connected to reactivate the alarm after a predetermined period of time following initial activation whenever the grease level in said tank remains above the intermediate liquid level.

5. An automated container for waste grease recycling, comprising:

a tank having a top, bottom, and at least one side wall with a plurality of openings;

a liquid level sensor mounted to said tank through one of the openings thereof, said liquid sensor located to respond to a high liquid level, an intermediate liquid level, and a low liquid level to generate a high level signal, an intermediate level signal, and a low level signal;

an inlet line for transferring waste grease to said tank, said inlet line mounted in one of the openings of said tank, the opening of the inlet line positioned in said tank at a level substantially about the high liquid level;

a fill pump coupled to the inlet line and having an input port connected to a fill line coupling;

an outlet line having a first end inserted in an opening of said tank and mounted thereto, said outlet line having an inlet in said tank at a level below the low liquid level;

a vent line inserted in one of the plurality of openings of said tank and mounted thereto, the opening of the vent line located in said tank at a level above the high liquid level;

a controller having a tank full indicator, a call-for-pickup indicator, and responsive to the high level signal, the intermediate level signal, and the low level signal, said controller connected to said fill pump; and said controller further including a processor responsive to the high level signal to actuate the tank full indicator and disable operation of said fill pump, said processor responsive to the intermediate level signal to actuate the call-for-pickup indicator and said processor controlling the elapsed time of operation of said fill pump.

6. The automated container for waste grease recycling as set forth in claim 5 including a fill line connected to the fill line coupling at one end thereof and connected to a source of waste grease at a second end thereof.

7. The automated container for waste grease recycling as set forth in claim 6 including a waste grease filter connected to the second end of said fill line to filter waste grease prior to entering said line.

8. The automated container for waste grease recycling as set forth in claim 5 wherein said processor responds to the high level signal to actuate said fill pump in a jogging mode to clear solidified grease blockage.

9. A method for automatic recycling of waste grease, comprising the steps of:

pumping waste grease from a waste grease source into a tank having a plurality of openings;

sensing the level of liquid waste grease in the tank to generate a high liquid level signal, an intermediate liquid level signal, and a low liquid level signal;

venting said tank by means of a vent line having an opening located in the tank at a level above the high liquid level;

measuring the temperature of grease within said tank to generate a grease temperature signal;

actuating a heater element inserted in an opening of said tank in response to measurement of the grease temperature;

actuating a tank full indicator in response to the high liquid level signal, actuating a call-for-pickup indicator in response to the intermediate liquid level signal;

deactivating the heating element in response to the low liquid level signal indicating a liquid level below a low liquid level; and removing waste grease from said tank through an outlet line having an inlet at a level below the low liquid level.

10. The method for automatic recycling of waste grease as set forth in claim 9 including the step of: discontinuing the pumping of waste grease into the tank in response to the generation of the high liquid level signal.

11. The method for automatic recycling of waste grease as set forth in claim 10 further including the step of: discontinuing the pumping of waste grease into the tank in response to an elapsed time exceeding a preset threshold.

12. The method for automatic recycling of waste grease as set forth in claim 9 including the step of: filtering the waste grease prior to pumping into said tank.

\* \* \* \* \*